(12) United States Patent
Vincent et al.

(10) Patent No.: US 9,013,998 B1
(45) Date of Patent: Apr. 21, 2015

(54) ESTIMATING ROUND-TRIP TIMES TO IMPROVE NETWORK PERFORMANCE

(75) Inventors: Pradeep Vincent, Kenmore, WA (US); Michael David Marr, Monroe, WA (US); Matthew D. Klein, Seattle, WA (US); Samuel J. McKelvie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 13/589,834

(22) Filed: Aug. 20, 2012

(51) Int. Cl.
*H04L 12/26* (2006.01)
*H04L 12/28* (2006.01)
*H04J 3/14* (2006.01)
*H04L 12/801* (2013.01)

(52) U.S. Cl.
CPC ...................................... *H04L 47/10* (2013.01)

(58) Field of Classification Search
CPC .. H04L 43/0841; H04L 47/283; G01S 5/0036
USPC .................................................. 370/235, 252
See application file for complete search history.

(56) References Cited

U.S. PATENT DOCUMENTS

| | | | |
|---|---|---|---|
| 7,102,998 B1 | 9/2006 | Golestani | |
| 7,406,081 B2 | 7/2008 | Kawakami et al. | |
| 8,134,934 B2 | 3/2012 | Chen et al. | |
| 2003/0039212 A1* | 2/2003 | Lloyd et al. | 370/235 |
| 2003/0067871 A1* | 4/2003 | Busi et al. | 370/222 |
| 2003/0133443 A1* | 7/2003 | Klinker et al. | 370/353 |
| 2005/0117521 A1* | 6/2005 | Abrol et al. | 370/252 |
| 2006/0072543 A1* | 4/2006 | Lloyd et al. | 370/351 |
| 2008/0037427 A1 | 2/2008 | Kist | |

OTHER PUBLICATIONS

U.S. Appl. No. 13/589,822 entitled "Congestion Mitigation in Networks Using Flow-Based Hashing" and filed Aug. 20, 2011.
U.S. Appl. No. 13/589,814 entitled "Flow Collision Avoidance" and filed Aug. 20, 2012.
Carrier Sense Multiple Access, http://www.princeton.edu/~achaney/tmve/wiki100k/docs/Carrier_sense_multiple_access.html, retrieved on Jul. 3, 2014.

* cited by examiner

*Primary Examiner* — Xavier Wong
(74) *Attorney, Agent, or Firm* — Thomas | Horstemeyer, LLP

(57) ABSTRACT

Disclosed are various embodiments for estimating round-trip times to improve performance of networks. Multiple connections are opened to a network device. Round-trip times associated with sending packets to the network device via the connections are measured. Another connection to the same or a different network device is opened. A round-trip-time estimate for the other connection is initialized based at least in part on the measured round-trip times for the multiple connections, and in some embodiments, network device proximity data.

26 Claims, 11 Drawing Sheets

ESTIMATING ROUND-TRIP TIMES TO IMPROVE NETWORK PERFORMANCE

BACKGROUND

Internet protocol (IP) is a best-effort network protocol. Packets which are sent by way of IP are not guaranteed to reach their destination. For example, packets may be dropped by overloaded IP routers. Furthermore, IP does not guarantee any particular delivery sequence for packets. If packets do ultimately arrive, they may be out of order. However, protocols such as transmission control protocol (TCP) may view out-of-order packets as a sign of network congestion. As a result, notwithstanding the lack of a guarantee for in-order delivery with IP, it is desirable to maintain in-order delivery of packets.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
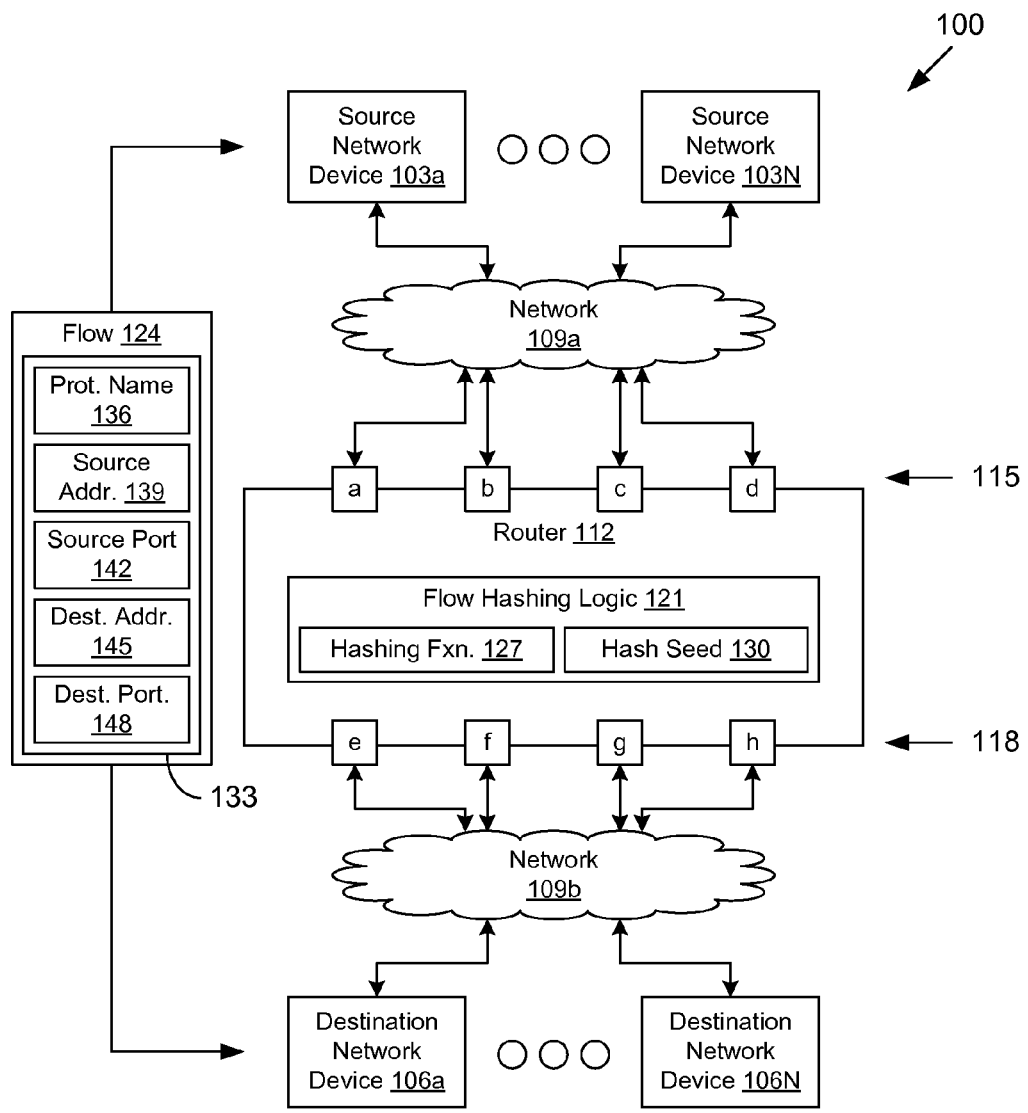
FIG. 1 is a drawing of a networked environment according to various embodiments of the present disclosure.

The present disclosure relates to avoiding flow collisions in networks that employ flow-based hashing. Networking devices, such as routers, switches, etc., may be configured to provide in-order delivery when possible. To this end, flow-based hashing may be employed in a networking device to maintain in-order delivery of packets. Flow-based hashing functions are used to forward network packets belonging to the same flow through the same route or egress port. By forwarding packets of the same flow through the same route, the probability of out-of-order delivery may be reduced.

With a layer 4 protocol such as TCP, user datagram protocol (UDP), etc., a flow may be identified as a n-tuple containing network packet header fields such as a network protocol, a source port, a source network address, a destination port, and/or a destination network address. In one scenario, packets having these fields in common are often said to belong to the same flow. In other scenarios, other fields such as virtual local area network (VLAN) tags, quality of service tags, etc. may be used to determine whether packets belong to a flow. A hash may be generated from one or more of these fields in order to assign the packets to one of multiple egress ports or routes. Although flow-based hashing may function well to prevent out-of-order delivery, flow-based hashing may also adversely impact network performance. By persistently forwarding flows through the same route, a scenario exists in which flows are assigned to overburdened routes, while other routes go underutilized. Congestion and dropped packets may result due to these flow collisions, even when there is little overall network contention. The use of overlay networks may worsen the problem as multiple overlay flows may be aggregated into a fewer number of substrate network flows to which flow-hashing is applied. For example, several disparate TCP or UDP flows initiated by different virtual machines or applications in a virtualized server environment may overlay a single internet protocol (IP) substrate flow between the service hosting domains of two physical servers.

Various embodiments of the present disclosure introduce solutions to avoid flow collisions when flow-based hashing is employed. For example, one or more port numbers that define the flow may be changed to provide a different hashing result. Flow collision avoidance may also be provided for overlay networks that include a port field or other field used for hashing in the overlay header. Port numbers may be changed randomly, in response to interruptions of flows, in response to congestion, and/or in other circumstances.

In one embodiment, network-wide congestion may be detected via network-health monitoring and incorporated in flow collision avoidance measures, for example, to minimize unnecessary flow avoidance churn or otherwise to respond more efficiently to incipient overall congestion or the like. In another embodiment, flow congestion may be detected in an overlay endpoint handling multiple flows. In yet another embodiment, cross-connection round-trip times may be employed to improve round-trip time estimation and network performance. A spatial correlation of round-trip times may also be employed to improve round-trip time estimation and network performance. In the following discussion, a general description of the system and its components is provided, followed by a discussion of the operation of the same.

With reference to FIG. 1, shown is a networked environment 100 according to various embodiments. The networked environment 100 includes, for example, a plurality of source network devices 103a . . . 103N, a plurality of destination network devices 106a . . . 106N, networks 109a and 109b, and a router 112. The source network devices 103 are in data communication with the router 112 through ingress ports 115 by way of the network 109a. The destination network devices 106 are in data communication with the router 112 through egress ports 118 by way of the network 109b. The networks 109a and 109b each may correspond to one or more networks such as, for example, the Internet, intranets, extranets, wide area networks (WANs), local area networks (LANs), wired networks, wireless networks, or other suitable networks, etc., or any combination of two or more such networks. In various embodiments, the networks 109a and 109b may be internet protocol (IP)-based networks or other networks where, for example, flow-based hashing may be employed.

The source network devices 103 and the destination network devices 106 may correspond to any device coupled to a network which is capable of sending and/or receiving routable network packets with header control fields amenable to flow hashing. To this end, the source network devices 103 and the destination network devices 106 may open connections, or "sockets," to other network devices reachable by way of the networks 109a, 109b. Such connections may employ UDP, TCP, or other protocols. Although described as "source" or "destination" devices for purposes of discussion, it is understood that the source network devices 103 and the destination network devices 106 may be interchangeable, may initiate connections in either direction, and such communication may be bidirectional via the networks 109a, 109b.

Each of the source network devices 103 and the destination network devices 106 may correspond to computing devices such as server computers, network switches, desktop computers, laptop computers, personal digital assistants, cellular telephones, smartphones, set-top boxes, music players, web pads, tablet computer systems, game consoles, electronic book readers, or other devices with like capability. Each of the source network devices 103 and the destination network devices 106 may have one or more network interfaces coupled to the networks 109a or 109b. Further, each of the source network devices 103 and the destination network devices 106 may include a network protocol stack capable of processing data received at various layers. Each of the source network devices 103 and the destination network devices 106 may include one or more network "hosts," where each network host is associated with a different network address.

The router 112 corresponds to any router, switch, bridge, etc. capable of routing packets or datagrams to and from the network 109a and the network 109b. Although the router 112 is shown as being coupled to two logical networks 109 in this example, the router 112 may be coupled to any number of logical networks 109 as desired. The router 112 may include a number of ports, which have been denoted here purely for purposes of discussion as ingress ports 115 and egress ports 118. Because the communication between the source network devices 103 and the destination network devices 106 may be bidirectional, the ingress ports 115 and egress ports 118 may be interchangeable. In this non-limiting example, four ingress ports 115 are shown, denoted "a," "b," "c," and "d," and four egress ports 118 are shown, denoted "e," "f," "g," and "h." Any number of ports may be employed in various embodiments, although the concepts herein primarily apply to systems which are logically routing to at least two egress ports.

The router 112 may include flow-hashing logic 121 that is configured to perform flow-based hashing, wherein flows 124 are assigned to particular egress ports 118 through a hashing approach. In one embodiment, the flow-hashing logic 121 may include a hashing function 127 and a hash seed 130 as parameters which control the flow-based hashing. Although one router 112 is shown for purposes of illustration and discussion, it is understood that the networks 109a and 109b may include any number of routers 112 which may implement flow-hashing logic 121. Further, in some cases, router 112 functionality may be implemented within network interface controllers (NICs) or virtual NICs of the source network devices 103, the destination network devices 106, and/or other network devices within the networks 109a, 109b. Such NICs and virtual NICs may also implement flow-hashing logic 121. It is noted a particular flow 124 may be processed by multiple instances of flow-hashing logic 121 within the networked environment 100.

Various flows 124 of packets, which may be unidirectional or bidirectional, are sent from the source network devices 103 to the destination network devices 106 via the network 109a, the router 112, and the network 109b. The flows 124 may correspond to TCP connections, UDP connections, and/or other types of connections where packet header control fields are amenable to identifying a common flow. Each flow 124 includes flow identification information 133 comprising, for example, a protocol name 136, a source address 139, a source port 142, a destination address 145, a destination port 148, and/or other data. In some embodiments, flows 124 may be identified by VLAN tags and/or any other arbitrary data in the packet format. The protocol name 136 identifies the type of flow (e.g., UDP, TCP, etc.).

The source address 139 may correspond to an IP address (e.g., 32 bits, 64 bits, etc.) of a host on a source network device 103. The source port 142 may identify a socket (e.g., 16 bits, etc.) of a host at the source address 139. The destination address 145 may correspond to an IP address (e.g., 32 bits for IP version 4, 128 bits for IP version 6, etc.) of a host on a destination network device 106. The destination port 148 may identify a socket (e.g., 16 bits, etc.) of a host at the destination address 145.

Next, a general description of the operation of the various components of the networked environment 100 is provided. To begin, a host at a source network device 103 opens a connection (e.g., TCP, UDP, etc.) to a host at a destination network device 106. Upon establishment of the connection, the host at the source network device 103 sends a flow 124 of packets to the destination network device 106. The packets in the flow 124 are routed through the network 109a, through the router 112, and through the network 109b to the host at the destination network device 106.

The packets in the flow 124 may be received by the router 112 at one or more of the ingress ports 115. The router 112 then determines an appropriate route for the packets from a routing table using a routing protocol. In this context, a route corresponds to a particular egress port 118. Generally speaking, the router 112 may determine that one route exists, multiple routes exist, or that the packets are unroutable. If the packets are unroutable, they may be dropped by the router 112. If the packets are routable by a single route, the router 112 may proceed to forward them to the egress port 118 corresponding to the single route.

However, if the packets are routable by multiple routes, the router 112 may be configured to consistently select one route from the multiple routes to avoid out-of-order arrival by the packets in the flow 124. To this end, the flow hashing logic 121 employs the hashing function 127 as configured by the hash seed 130 to hash at least a portion of the flow identification information 133 to select one of the multiple routes. For example, suppose that the flow 124 is routable through any of egress ports 118 "e," "f," or "g." The flow hashing logic 121 may apply the hashing function to one or more fields of the flow identification information 133 to select port "f." Port "f" continues to be selected for all packets in the flow 124 having the flow identification information 133 to avoid creating out-of-order situations.

Although the flow hashing logic 121 may be configured to randomly assign flows 124 to egress ports 118, in various circumstances, network congestion may result. A route through port "f" may be overburdened and lack network capacity, while a route through port "e" may be underutilized.

"Flow collisions," as used herein, refers to flows 124 which are assigned to the same egress port 118 and which result in network congestion. The network congestion may be unnecessary, because without flow-based hashing, the packets may be distributed among the routes. Notwithstanding these issues, it may be desirable not to disable flow-based hashing due to the out-of-order packet problem.

To better this situation and relieve the unnecessary network congestion, flows 124 may be reassigned to other routes. A first approach may involve changing the hashing function 127 or the hash seed 130 to produce different assignments of flows 124 to egress ports 118. However, the router 112 may correspond to commodity hardware and may not support such a change, or otherwise changing the hashing function 127 for the entire router 112 may cause several flows 124 through the router 112 to be disrupted.

An alternative approach may involve perturbing or changing the flow identification information 133 for the particular flow 124 so that the existing flow hashing logic 121 will produce a different assignment result. In such an approach, it may be desirable to change the source port 142 and/or the destination port 148 rather than the protocol name 136, the source address 139, or the destination address 145 which could substantially affect routing or processing.

The perturbation of the flow identification information 133 may be performed according to a randomized process, including a pseudo-randomized process. The perturbation may instead be performed at regular intervals if desired. By switching the flow 124 from one route assignment to another, the perturbation may cause a temporary or singular out-of-order packet situation that may impact performance. Thus, it may be desirable not to perform the perturbation too frequently or beyond a certain interval.

Alternatively, the perturbation of the flow identification information 133 may be performed in response to a sign of network congestion, such as a dropped packet, a delayed packet, etc. Congestion detection may be performed through acknowledgements of received packets from the destination network devices 106, indications of lost, missing, or delayed packets from the destination network devices 106, and so on. With various protocol stacks, a packet which is delayed beyond a certain time may be regarded as lost, even if it is received later.

In some cases, the perturbation of the flow identification information 133 may be scheduled relative to a temporary interruption in the flow 124. A temporary interruption in the flow 124 makes it more likely that the packets already in transit within the congestion window of the host on the destination network device 106 will be received before packets of the perturbed flow 124 that are routed differently. Consequently, out-of-order packets may be avoided.

In various embodiments, the perturbation may be initiated by the source network device 103, the destination network device 106, the router 112, or any other network device that processes the flow 124. It may be preferable to situate the initiation logic in a network device that is capable of detecting congestion affecting the flow 124. The network device which initiates the perturbation is further configured to update a state associated with the flow 124. Further, the network device which initiates the perturbation may be configured to notify either the source endpoint or the destination endpoint for the flow. For example, the source network device 103 and the destination network device 106 may each update the socket associated with the flow 124 to use the new source port 142 and/or destination port 148. In another embodiment, a network device may instead request a change to the flow hashing logic 121 in the router 112 to effect a perturbation.

Figure 2:
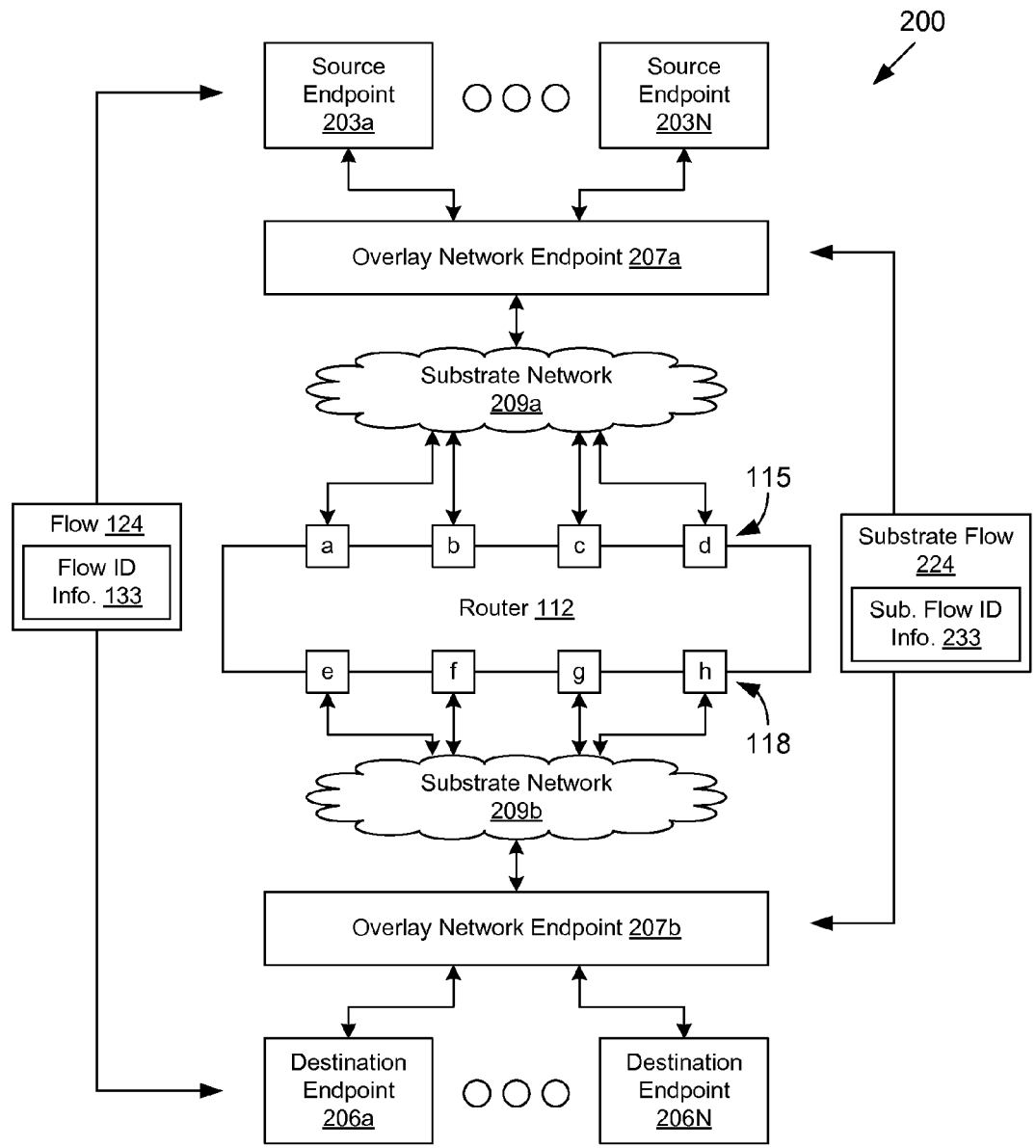
FIG. 2 is a drawing of another networked environment implementing an overlay network according to various embodiments of the present disclosure.

Turning now to FIG. 2, shown is another networked environment 200 which implements an overlay network according to various embodiments. The networked environment 200 includes, for example, a plurality of source endpoints 203a . . . 203N, a plurality of destination endpoints 206a . . . 206N, overlay network endpoints 207a and 207b, substrate networks 209a and 209b, and the router 112 with ingress ports 115 and egress ports 118. In contrast to the networked environment 100 (FIG. 1), the networked environment 200 implements an overlay network on top of the substrate networks 209a and 209b as will be described.

The source endpoints 203 are in data communication with the overlay network endpoint 207a. The overlay network endpoint 207a maps or encapsulates the data from the source endpoints 203 for transit on the substrate network 209a. The mapped or encapsulated data is received by the router 112 through ingress ports 115. The destination endpoints 206 are in data communication with the overlay network endpoint 207b. The overlay network endpoint 207b unmaps or de-encapsulates the data received via the substrate network 209b from the router 112 through egress ports 118. The substrate networks 209a and 209b each may correspond to one or more networks such as, for example, the Internet, intranets, extranets, wide area networks (WANs), local area networks (LANs), wired networks, wireless networks, or other suitable networks, etc., or any combination of two or more such networks. In various embodiments, the substrate networks 209a and 209b may be internet protocol (IP)-based networks or other networks where, for example, flow-based hashing may be employed.

The source endpoints 203 and the destination endpoints 206 may correspond to any device coupled to a network which is capable of sending and/or receiving routable network packets with header control fields amenable to flow hashing as known in the art. For example, the source endpoints 203 and the destination endpoints 206 may correspond to the source network devices 103 and the destination network devices 106, respectively. The source endpoints 203 and the destination endpoints 206 may open connections, or "sockets," to other network devices reachable by way of the overlay network. Such connections may employ UDP, TCP, or other protocols. Although described as "source" or "destination" endpoints for purposes of discussion, it is understood that the source endpoints 203 and the destination endpoints 206 may be interchangeable, may initiate connections in either direction, and such communication may be bidirectional via the overlay network.

Each of the source endpoints 203 and the destination endpoints 206 may correspond to computing devices such as server computers, network switches, desktop computers, laptop computers, personal digital assistants, cellular telephones, smartphones, set-top boxes, music players, web pads, tablet computer systems, game consoles, electronic book readers, or other devices with like capability. Each of the source endpoints 203 and the destination endpoints 206 may have one or more network interfaces in data communication with the overlay network endpoint 207a or 207b. In some cases, one or more source endpoints 203 may be executed in the same network device as the overlay network endpoint 207a, and one or more destination endpoints 206 may be executed in the same network device as the overlay network endpoint 207b. Further, each of the source endpoints 203 and the destination endpoints 206 may include a network protocol stack capable of processing data received at various layers. Each of the source endpoints 203 and the destination endpoints 206 may include one or more network "hosts," where each network host is associated with a different network address on the overlay network.

The overlay network endpoints 207a and 207b are configured to map and unmap (or encapsulate or de-encapsulate, as the case may be) overlay network data to be sent via the substrate networks 209a and 209b and the router 112. The overlay network endpoints 207a and 207b may employ, for example, a layer-4 overlay protocol, a layer-3 overlay protocol, or other protocols. Although described as overlay network endpoints 207a and 207b, as an alternative, the overlay network endpoints 207a and 207b may be said to correspond to substrate network endpoints. The router 112 may correspond to the router 112 as in FIG. 1, which may include flow-hashing logic 121 (FIG. 1) that is be configured to perform flow-based hashing, wherein flows 124 are assigned to particular egress ports 118 through a hashing approach.

Various flows 124 of packets, which may be unidirectional or bidirectional, are sent from the source endpoints 203 to the destination endpoints 206 via the overlay network implemented by the networked environment 200. The flows 124 may correspond to TCP connections, UDP connections, and/or other types of connections where packet header control fields are amenable to identifying a common flow 124. Each flow 124 may include flow identification information 133 comprising, for example, a protocol name 136 (FIG. 1), a source address 139 (FIG. 1), a source port 142 (FIG. 1), a destination address 145 (FIG. 1), a destination port 148 (FIG. 1), and/or other data.

The flows 124 are mapped by the overlay network endpoint 207a and 207b to substrate flows 224. This mapping may involve encapsulation by adding additional packet framing in some embodiments. The substrate flows 224 include substrate flow identification information 233. The substrate flow identification information 233 may include, for example, a substrate source address and a substrate source port associated with the overlay network endpoint 207a, a substrate destination address and a substrate destination port associated with the overlay network endpoint 207b, and/or other data.

Next, a general description of the operation of the various components of the networked environment 200 is provided. To begin, a source endpoint 203 opens a connection (e.g., TCP, UDP, etc.) to a destination endpoint 206 via the overlay network. Upon establishment of the connection, the source endpoint 203 sends a flow 124 of packets to the destination endpoint 206. The packets in the flow 124 are routed to the overlay network endpoint 207a, which maps them to a substrate flow 224 for transit through the substrate network 209a, the router 112, and the substrate network 209b. The packets of the substrate flow 224 arrive at the overlay network endpoint 207b, which unmaps the substrate flow 224 to the flow 124 and routes the packets to the appropriate destination endpoint 206 via the overlay network.

The packets in the substrate flow 224 may be received by the router 112 at one or more of the ingress ports 115. The router 112 then determines an appropriate route for the packets from a routing table using a routing protocol. In this context, a route corresponds to a particular egress port 118. Generally speaking, the router 112 may determine that one route exists, multiple routes exist, or that the packets are unroutable. If the packets are unroutable, they may be dropped by the router 112. If the packets are routable by a single route, the router 112 may proceed to forward them to the egress port 118 corresponding to the single route.

However, if the packets are routable by multiple routes, the router 112 may be configured to select one route from the multiple routes to avoid out-of-order arrival by the packets in the substrate flow 224. To this end, the flow hashing logic 121 employs the hashing function 127 (FIG. 1) as configured by the hash seed 130 (FIG. 1) to hash at least a portion of the substrate flow identification information 233 to select one of the multiple routes. For example, suppose that the substrate flow 224 is routable through any of egress ports 118 "e," "f," or "g." The flow hashing logic 121 may apply the hashing function to one or more fields of the substrate flow identification information 233 to select port "f." Port "f" continues to be selected for all packets in the substrate flow 224 having the substrate flow identification information 233 to avoid creating out-of-order situations.

In various embodiments, the overlay network endpoint 207a may aggregate multiple different flows 124 into substrate flows 224 having the same source and destination addresses. To accommodate flow-based hashing by the router 112 and to avoid assigning the different flows 124 to the same egress port 118 where multiple egress ports 118 are potential routes, the substrate flow identification information 233 may include one or more identifiers (e.g., substrate source port, substrate destination port, etc.) which are generated from at least a portion of the flow identification information 133 for the mapped flow 124. To this end, the overlay network endpoint 207a may include flow hashing logic 121 to generate the substrate source and/or destination ports from the flow identification information 133. In one non-limiting example, the flow hashing logic 121 of the overlay network endpoint 207a may hash the 16-bit source port 142 to fit into an 8-bit substrate source port. The flow hashing logic 121 of the router 112 may then assign the substrate flow 224 to a route based at least in part on the substrate source port and/or other information in the substrate flow identification information 233.

The problems associated with flow collisions may be apparent in overlay networks as well. Similar solutions to those used in FIG. 1 may be used with respect to overlay networks. A perturbation to the substrate flow identification information 233 may be effected by changing a hash seed 130 or hashing function 127 (FIG. 1) in the flow hashing logic 121 of the router 112. In various embodiments, such a change may be initiated by the router 112, the overlay network endpoints 207a or 207b, the source endpoints 203, the destination endpoints 206, and/or other network devices. Such a change may be initiated randomly, at an interval, in response to detecting congestion, or at other times. The change may be scheduled relative to a temporary interruption in the substrate flow 224 to reduce out-of-order packets.

Alternatively, a perturbation to the substrate flow identification information 233 may be effected by changing a hash seed 130 or hashing function 127 in the flow hashing logic 121 of the overlay network endpoint 207a. For example, where the substrate source port is generated by the hashing function 127 in the overlay network endpoint, a change to the hashing function 127 may result in a different substrate source port for the substrate flow 224. In various embodiments, such a change may be initiated by the overlay network endpoints 207a or 207b, the source endpoints 203, the destination endpoints 206, and/or other network devices. Such a change may be initiated randomly, at an interval, in response to detecting congestion, or at other times. The change may be scheduled relative to a temporary interruption in the flow 124 to reduce out-of-order packets.

A first alternative approach may involve perturbing or changing the flow identification information 133 for the flow 124 so that the existing flow hashing logic 121 in the overlay network endpoint 207a will produce different substrate flow identification information 233. For example, changing the flow identification information 133 may produce different source or destination port information in the substrate flow identification 233. As a byproduct, this can perturb the substrate routing as long as ports are accounted for in the flow hashing logic 121 of router 112. A second alternative approach may involve perturbing or changing the substrate flow identification information 233 directly. The perturbation of the flow identification information 133 and/or the substrate flow identification information 233 may be performed according to a randomized process, including a pseudo-randomized process. The perturbation may instead be performed at regular intervals if desired. By switching the flow 124 and/or the substrate flow 224 from one route assignment to another, the perturbation may cause a temporary or singular out-of-order packet situation that may impact performance. Thus, it may be desirable not to perform the perturbation too frequently or beyond a certain interval.

Alternatively, the perturbation of the flow identification information 133 and/or the substrate flow identification information 233 may be performed in response to indications of network congestion, such as a dropped packet, a delayed packet, etc. Congestion detection may be performed through acknowledgements of received packets from the destination endpoints 206 and/or the overlay network endpoint 207b, indications of lost, missing, or delayed packets from the destination endpoints 206 and/or the overlay network endpoint 207b, and so on. With various protocol stacks, a packet which is delayed beyond a certain time may be regarded as lost, even if it is received later.

The perturbation of the flow identification information 133 may be scheduled relative to a temporary interruption in the flow 124 and/or the perturbation of the substrate flow identification information 233 may be scheduled relative to a temporary interruption in the flow 124 and/or the substrate flow 224. A temporary interruption in the flow 124 (or substrate flow 224) makes it more likely that the packets already in transit within the congestion window of overlay network endpoint 207b or the destination endpoint 206 will be received before packets of the perturbed substrate flow 224 or the perturbed flow 124 that are routed differently. Consequently, out-of-order packets may be minimized.

In various embodiments, the perturbation may be initiated by the source network device 103, the destination network device 106, the router 112, or any other network device that processes the flow 124. It may be preferable to situate the initiation logic in a network device that is capable of detecting congestion affecting the flow 124. The network device which initiates the perturbation may be further configured to update a state associated with the flow 124. Further, the network device which initiates the perturbation may be configured to notify either the source endpoint or the destination endpoint for the flow. For example, the source network device 103 and the destination network device 106 may each update the socket associated with the flow 124 to use the new source port 142 and/or destination port 148. In another embodiment, a network device may instead request a change to the flow hashing logic 121 in the router 112 to effect a perturbation.

Such a perturbation may be initiated in various embodiments by the router 112, the overlay network endpoints 207a or 207b, the source endpoints 203, the destination endpoints 206, and/or other network devices. Such a change may be initiated randomly, at an interval, in response to detecting congestion, or at other times. The change may be scheduled relative to a temporary interruption in the substrate flow 224 to reduce out-of-order packets.

Figure 3:
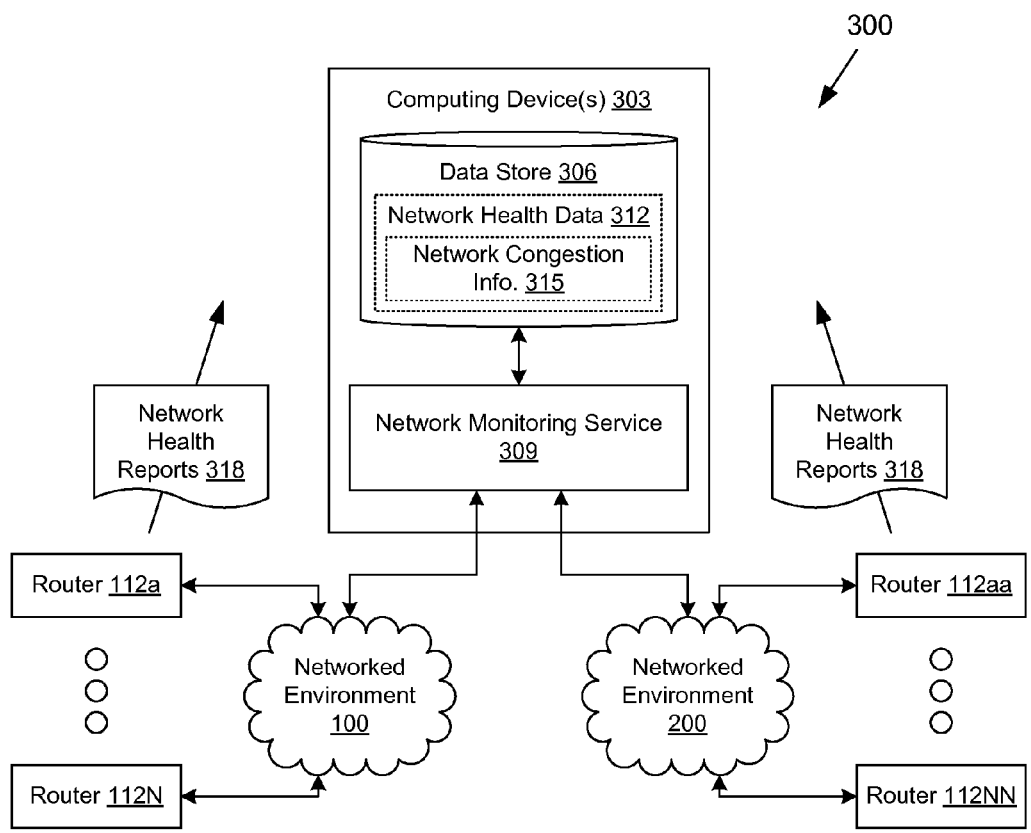
FIG. 3 is a drawing of another networked environment implementing network health monitoring according to various embodiments of the present disclosure.

Continuing now to FIG. 3, shown is a networked environment 300 according to various embodiments. The networked environment 300 includes one or more computing devices 303 coupled to a network in the networked environment 100 (FIG. 1) and/or 200 (FIG. 2). The networked environment 100 may be coupled to any number of routers 112a ... 112N, switches, bridges, hubs, etc. Likewise, the networked environment 200 may be coupled to any number of routers 112aa ... 112NN, switches, bridges, hubs, etc.

The computing device 303 may comprise, for example, a server computer or any other system providing computing capability. Alternatively, a plurality of computing devices 303 may be employed that are arranged, for example, in one or more server banks or computer banks or other arrangements. For example, a plurality of computing devices 303 together may comprise a cloud computing resource, a grid computing resource, and/or any other distributed computing arrangement. Such computing devices 303 may be located in a single installation or may be distributed among many different geographical locations. For purposes of convenience, the computing device 303 is referred to herein in the singular. Even though the computing device 303 is referred to in the singular, it is understood that a plurality of computing devices 303 may be employed in the various arrangements as described above.

Various applications and/or other functionality may be executed in the computing device 303 according to various embodiments. Also, various data is stored in a data store 306 that is accessible to the computing device 303. The data store 306 may be representative of a plurality of data stores 306 as can be appreciated. The data stored in the data store 306, for example, is associated with the operation of the various applications and/or functional entities described below.

The components executed on the computing device 303, for example, include a network monitoring service 309 and other applications, services, processes, systems, engines, or functionality not discussed in detail herein. The network monitoring service 309 is executed to monitor various network devices in the networked environment 100 and/or 200, including, for example, the router 112 (FIGS. 1 & 2) and/or other devices. The network monitoring service 309 may employ simple network management protocol (SNMP) and/or other protocols and technologies that enable monitoring the status, health, and/or other information regarding network devices.

The data stored in the data store 306 includes, for example, network health data 312 and potentially other data. The network health data 312 describes the current health of various network devices employed in the networked environments 100 and/or 200. The network health data 312 may include network congestion information 315 relative to various network device employed in the networked environments 100 and/or 200. The network health data 312 may be generated in response to actions of the network monitoring service 309 and/or other services or network devices.

Next, a general description of the operation of the various components of the networked environment 300 is provided. To begin, the network monitoring service 309 monitors various network devices in the networked environments 100 and/or 200, thereby generating the network health data 312 stored in the data store 306. To this end, the network monitoring service 309 may obtain network health reports 318 from the routers 112 via SNMP polling or other protocols and/or technologies in order to generate the network health data 312. In another embodiment, the routers 112 may send health data 312 to the network monitoring service 309 directly through a variety of application programming interfaces or other protocols. In other embodiments, a combination of polling from the network monitoring service 309 and posting to the network monitoring service 309 may be employed. The network health data 312 may be used to assist in determining whether to perform the perturbations to flow identification information 133 (FIG. 1) or substrate flow identification information 233 (FIG. 2) described in connection with FIGS. 1 and 2.

When the flow identification perturbations or hashing changes are performed in response to network congestion, it may be desirable to have network congestion information 315 from the network health data 312 to determine, for example, whether the detected congestion affects multiple routes or merely affects a single route in the router 112. If the congestion is affecting multiple routes or is a network-wide problem, flow identification perturbations or hashing changes may be unlikely to assist the situation. The flow identification perturbations or hashing changes are designed to ameliorate situations where flow collisions have created suboptimal local route selection, e.g., the flows 124 (FIG. 1) are aggregated onto a single egress port 118 (FIG. 1) causing congestion on that egress port 118, while other egress ports 118 are underutilized.

However, the congestion may be network-wide or affecting all of the potential egress ports 118. In such a case, changing the flow identification or hashing mechanism will provide no benefit. Further, such changes may result in out-of-order packets or other detrimental conditions. Accordingly, the change initiators from the networked environment 100 and/or 200 may be configured to initiate a change responsive to network congestion information 315 in the network health data 312 obtained from the network monitoring service 309. Specifically, the change to the flow identification or hashing mechanism may be implemented when the congestion experienced by a flow 124 or substrate flow 224 (FIG. 2) is caused by local flow collisions. Conversely, the change initiators may refrain from making such a change when the congestion experienced by a flow 124 or substrate flow 224 is not likely caused by local flow collisions and is instead caused overloading, denial of service attacks, equipment failure, and/or other reasons.

Although FIG. 3 describes a network monitoring service 309 that aggregates network health data 312, it is understood the various endpoints and network devices in the networked environments 100 and 200 may maintain local network health information, such as congestion information, etc. In some embodiments, a network device or endpoint may choose to perturb a flow 124 or substrate flow 224 on the basis of locally available congestion information rather than congestion information from a global network monitoring service 309.

Figure 4:
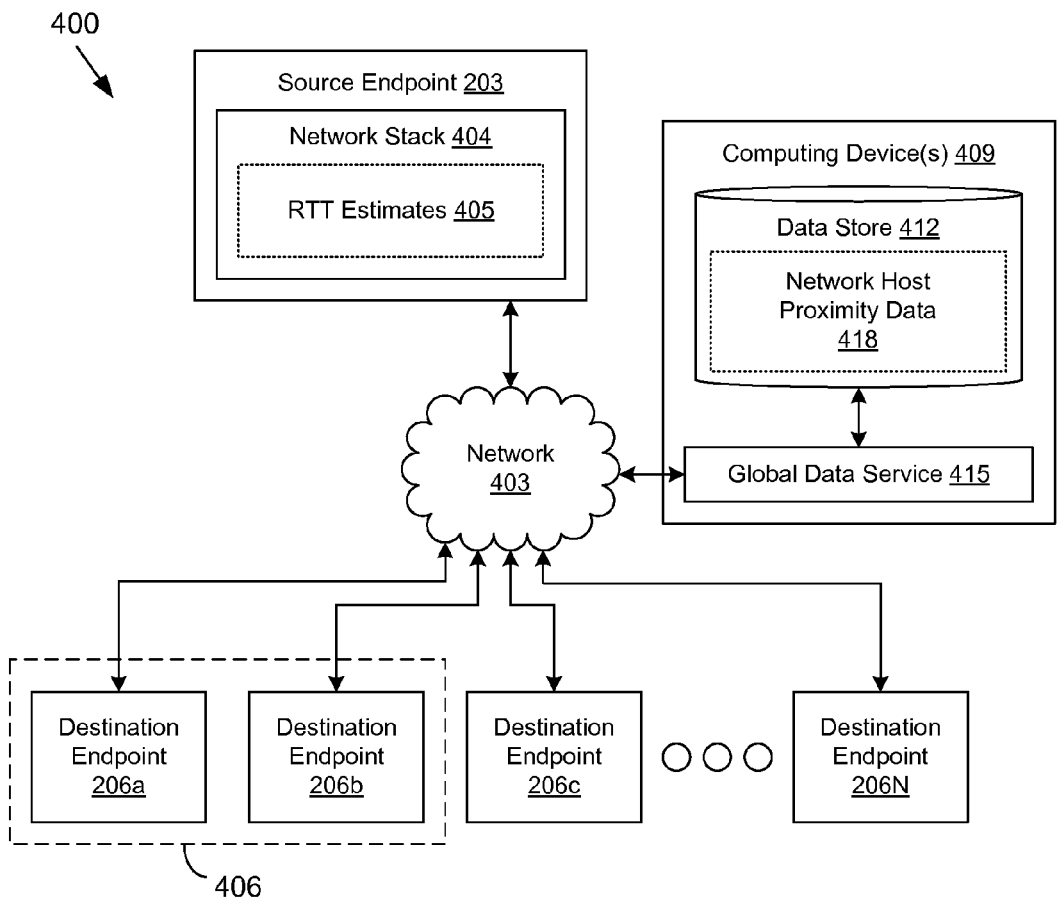
FIG. 4 is a drawing of another networked environment implementing real-trip time estimation across connections according to various embodiments of the present disclosure.

Referring next to FIG. 4, shown is a networked environment 400 according to various embodiments. The networked environment 400 includes a source endpoint 203 and a plurality of destination endpoints 206a, 206b, 206c . . . 206N by way of a network 403. Some of destination endpoints 206, e.g., destination endpoints 206a and 206b, may be situated in a proximate area 406. The source endpoint 203 and the destination endpoints 206 may correspond to separate network hosts provided in one or more network devices as described in connection with FIG. 2. The network 403 may include, for example, the Internet, intranets, extranets, wide area networks (WANs), overlay networks, local area networks (LANs), wired networks, wireless networks, or other suitable networks, etc., or any combination of two or more such networks. The source endpoint 203 may include a network stack 404 such as a TCP stack, UDP stack, etc. The network stack 404 may maintain a plurality of RTT estimates 405.

The networked environment 400 may also include a computing device 409 in data communication with the source endpoint 203 and/or the destination endpoints 206 by way of the network 403. The computing device 409 may comprise, for example, a server computer or any other system providing computing capability. Alternatively, a plurality of computing devices 409 may be employed that are arranged, for example, in one or more server banks or computer banks or other arrangements. For example, a plurality of computing devices 409 together may comprise a cloud computing resource, a grid computing resource, and/or any other distributed computing arrangement.

Such computing devices 409 may be located in a single installation or may be distributed among many different geographical locations. For purposes of convenience, the computing device 409 is referred to herein in the singular. Even though the computing device 409 is referred to in the singular, it is understood that a plurality of computing devices 409 may be employed in the various arrangements as described above. Although the computing device 409 is described separately from the source endpoint 203 and the destination endpoints 206, it is understood that the source endpoint 203 and/or one or more of the destination endpoints 206 may be provided by the computing device 409 in some embodiments.

Various applications and/or other functionality may be executed in the computing device 409 according to various embodiments. Also, various data is stored in a data store 412 that is accessible to the computing device 409. The data store 412 may be representative of a plurality of data stores 412 as can be appreciated. The data stored in the data store 412, for example, is associated with the operation of the various applications and/or functional entities described below.

The components executed on the computing device 409, for example, include a global data service 415 and other applications, services, processes, systems, engines, or functionality not discussed in detail herein. The global data service 415 is executed to serve up globally applicable network data such as proximity data in response to requests for a measure of logical or physical proximity between two network hosts, such as the destination endpoints 206. The data stored in the data store 412 includes, for example, network host proximity data 418 and potentially other data. The network host proximity data 418 indicates the physical and/or logical proximity between network hosts in the networked environment 400. The network host proximity data 418 may be manually preconfigured or automatically generated by the global data service 415.

Next, a general description of the operation of the various components of the networked environment 400 is provided. To begin, it is desirable to have an accurate estimate of round-trip time for the use of TCP and/or other protocols. Round-trip time corresponds for the time it takes for a packet to be sent from a local host to a remote host, plus the time it takes for an acknowledgement to be received from the second host. Round-trip time is important for automatic repeat request (ARQ) protocols such as TCP because if no acknowledgement is received from the remote host within a timeout period, a packet is considered lost and is resent.

If the round-trip time estimate 405 employed by the protocol stack is too short, a packet that is received by the remote end may be considered lost merely because the acknowledgment is not received by the local end in time. Likewise, if the round-trip time estimate 405 is too long, the local end may be delayed in resending a packet that was not received by the remote end. In addition, the round-trip time estimate 405 may affect the operation of congestion control parameters. For example, a received packet that merely appears to be lost due to an incorrect round-trip time estimate 405 may incorrectly cause a congestion avoidance state to be entered. Although an estimate of round-trip time may be learned empirically for a particular connection through sending of data and receiving acknowledgments, various embodiments herein provide initial estimates of round-trip time for connections. For example, these initial estimates may be selected manually or inferred from design specifications of the networking devices and the topology of the network 403. That is, each network device may introduce, e.g., a 90$^{th}$ percentile time delay and the route between two hosts may encompass a predictable number or set of network devices. These may be aggregated to predict an overall round-trip maximum estimate.

Also, a source endpoint 203 may include automatic cache invalidation for the stored round-trip time estimates 405 to provide a time bound for the data. To this end, the cache of stored round-trip time estimates 405 may be invalidated upon address reassignment. For example, if logical addresses are used, an address may be re-provisioned and the new server using the address may be nowhere near the server to which the address was formerly assigned. Address reassignment is typically done through a centralized service such as dynamic host configuration protocol (DHCP). Such a service could potentially notify the global data service 415 of the address invalidations, namely, that a new address would be assigned and the stored round-trip time estimates 405 would need to be recalculated for routes involving that address. Once a round-trip time estimate 405 expires, the source endpoint 203 may retrieve a properly updated estimate from the global data service 415. Alternatively, the source endpoint 203 may periodically update the estimated round-trip time at some reasonable interval (e.g., 5 minutes or another interval) or whenever a new socket is opened to an address.

In a first embodiment, a source endpoint 203 may open one or more connections to a particular destination endpoint 206 by way of the network 403. Packets are sent and received via the connection, and an estimate of the round-trip time may be developed. The source endpoint 203 may store the round-trip time estimate 405 in association with an identifier of the destination endpoint 206 (e.g., a network address, etc.). When the source endpoint 203 opens a subsequent connection to the particular destination endpoint 206, the source endpoint 203 may initialize the estimate of round-trip time to the destination endpoint 206 based at least in part upon the stored round-trip time estimate 405 associated with the destination endpoint 206.

In a second embodiment, network host proximity data 418 from a global data service 415 is employed by the source endpoint 203 to estimate round-trip times based at least in part on network host proximity. For example, the source endpoint 203 may open one or more connections to the destination endpoint 206a, thereby developing an estimate of round-trip times for the destination endpoint 206a in accordance with the first embodiment. The destination endpoint 206a may be proximate to the destination endpoint 206b by being situated in a proximate area 406 such as a data center, a rack in a data center, or other similar shared location.

One component of round-trip time may depend on the length of the media through which two hosts are connected. Thus, if two destination endpoints 206a and 206b are physically near one another, the round-trip time between the source endpoint 203 and the destination endpoint 206a may be a good approximation for the round-trip time between the source endpoint 203 and the destination endpoint 206b.

The approximation may also depend on the logical routing between the respective hosts. For example, if two destination endpoints 206a and 206b are physically near one another, but the connections between the source endpoint 203 and each are routed substantially differently in the network 403, the round-trip time between the source endpoint 203 and the destination endpoint 206a might not be a good approximation for the round-trip time between the source endpoint 203 and the destination endpoint 206b. Conversely, if two destination endpoints 206a and 206b are not physically near one another, but the connections between the source endpoint 203 and each are routed similarly in the network 403, the round-trip time between the source endpoint 203 and the destination endpoint 206a might be a good approximation for the round-trip time between the source endpoint 203 and the destination endpoint 206b.

The global data service 415 may automatically learn the logical proximities between network hosts through comparison of similar round-trip times. For example, a source endpoint 203 might report round-trip times for various destination endpoints 206 to the global data service 415 and proximity might be inferred. Alternatively, the physical proximity between destination endpoints 206 may be manually preconfigured for the global data service 415.

In the second embodiment, when a source endpoint 203 wishes to make a connection to a destination endpoint 206b, the source endpoint 203 may communicate with the global data service 415 to obtain network host proximity data 418 indicating whether destination endpoint 206b is physically or logically proximate to the destination endpoint 206a. In some cases, the network host proximity data 418 may be cached or otherwise maintained by the source endpoint 203. For example, the source endpoint 203 may automatically infer proximity via similar observed round-trip times.

If the source endpoint 203 determines that the destination endpoint 206b is proximate to the destination endpoint 206a, and if the source endpoint 203 already has a round-trip time estimate 405 for the destination endpoint 206a, then the source endpoint 203 may initialize a round-trip time estimate 405 for the destination endpoint 206b from the estimate for the destination endpoint 206a. This decision to use a similar estimate may be made according to a threshold for proximity. Alternatively, the estimate for the destination endpoint 206b may be determined more generally as a function of the proximity between the destination endpoints 206a and 206b and the round-trip time estimate 405 for the destination endpoint 206a.

In other embodiments, the source endpoint 203 may monitor detected round-trip times for the destination endpoints 206 in order to detect congestion caused by flow collisions. If the network host proximity data 418 indicates that two destination endpoints 206a and 206b are near one another, the measured round-trip times to each should be the same or approximately so. If the measured round-trip times differ, the congestion causing the latency may be due to flow collisions, which may suggest an opportunity to perturb one or more flows 124 (FIG. 1) to avoid the congestion.

In such embodiments, the round-trip times may be ascertained via probing via internet control message protocol (ICMP) ping or another approach. For example, a network device or endpoint may have a list of neighboring devices on a network and may periodically send pings to the neighboring devices in order to measure round-trip times. In one scenario, such probing may be scheduled for times of low network utilization. In another scenario, such probing may occur irrespective of network utilization.

Figure 5A:
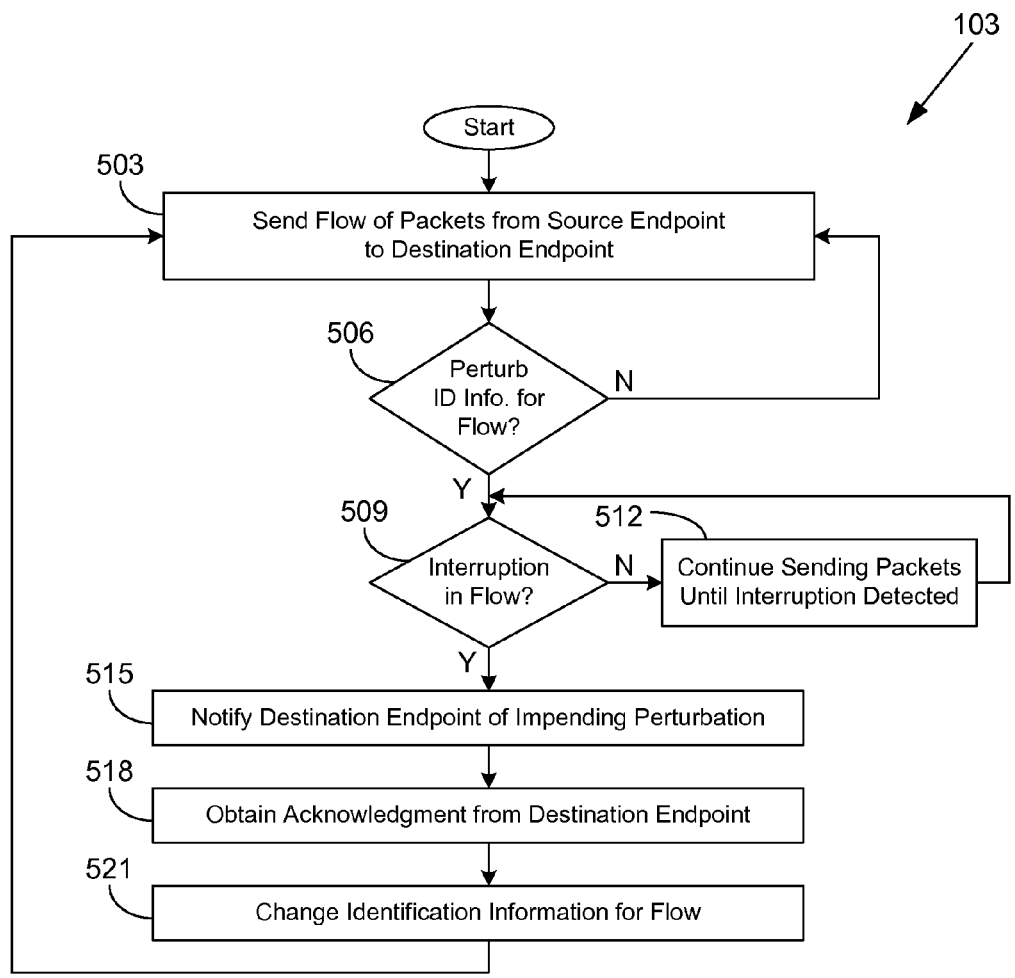
FIGS. 5A-5C are flowcharts illustrating examples of functionality implemented as portions of a source network device in the networked environment of FIG. 1 according to various embodiments of the present disclosure.

Referring next to FIG. 5A, shown is a flowchart that provides one example of the operation of a portion of the source network device 103 according to various embodiments. It is understood that the flowchart of FIG. 5A provides merely an example of the many different types of functional arrangements that may be employed to implement the operation of the portion of the source network device 103 as described herein. As an alternative, the flowchart of FIG. 5A may be viewed as depicting an example of steps of a method implemented in the source network device 103 according to one or more embodiments.

Beginning with box 503, the source network device 103 sends a flow 124 (FIG. 1) of packets from a source endpoint 203 (FIG. 2) to a destination endpoint 206 (FIG. 2) at a destination network device 106 (FIG. 1). The sending may involve forwarding the flow 124 of packets to an intermediate destination in a network, e.g., a gateway. In box 506, the source network device 103 determines whether the flow identification information 133 (FIG. 1) for the flow 124 is to be perturbed. For example, the source network device 103 may be configured to perturb the flow identification information 133 randomly, at predefined intervals, in response to detecting congestion, etc. In some embodiments, the source network device 103 may be configured to request a change to flow hashing logic 121 (FIG. 1) implemented in the router 112 (FIG. 1) or other equipment in the network 109*a* (FIG. 1) or network 109*b* (FIG. 1) instead of changing the flow identification information 133 directly. If the source network device 103 determines not to perturb the flow identification information 133, the source network device 103 returns to box 503 and continues sending the flow 124 of packets.

If, instead, the source network device 103 determines that the flow identification information 133 for the flow 124 is to be perturbed, the source network device 103 continues from box 506 to box 509. In box 509, the source network device 103 determines whether a temporary interruption in the flow 124 is detected. For example, the perturbation may be performed relative to such a temporary interruption. In other embodiments, however, the perturbation may be performed irrespective to a temporary interruption.

If a temporary interruption is not detected, the source network device 103 may move to box 512 and continue sending packets for the flow 124 until such an interruption is detected. The source network device 103 then returns to box 509. If, instead, a temporary interruption in the flow 124 is detected, the source network device 103 moves from box 509 to box 515.

In box 515, the source network device 103 notifies the destination endpoint 206 of an impending perturbation. Alternatively, the source network device 103 may update some other type of state to effect the perturbation. In box 518, the source network device 103 obtains an acknowledgment from the destination endpoint 206. In box 521, the source network device 103 implements a change to the flow identification information 133 for the flow 124. For example, the source network device 103 may change the source port 142 (FIG. 1), the destination port 148 (FIG. 1), and/or other data employed in the flow identification information 133. In some embodiments, the change to the flow identification information 133 may be effected first by the destination network device 106. The change may be effected by implementing a change to an active connection associated with the flow 124 that is maintained by a network stack. The source network device 103 then returns to box 503 and continues sending the flow 124 of packets according to the perturbed flow identification information 133.

Figure 5B:
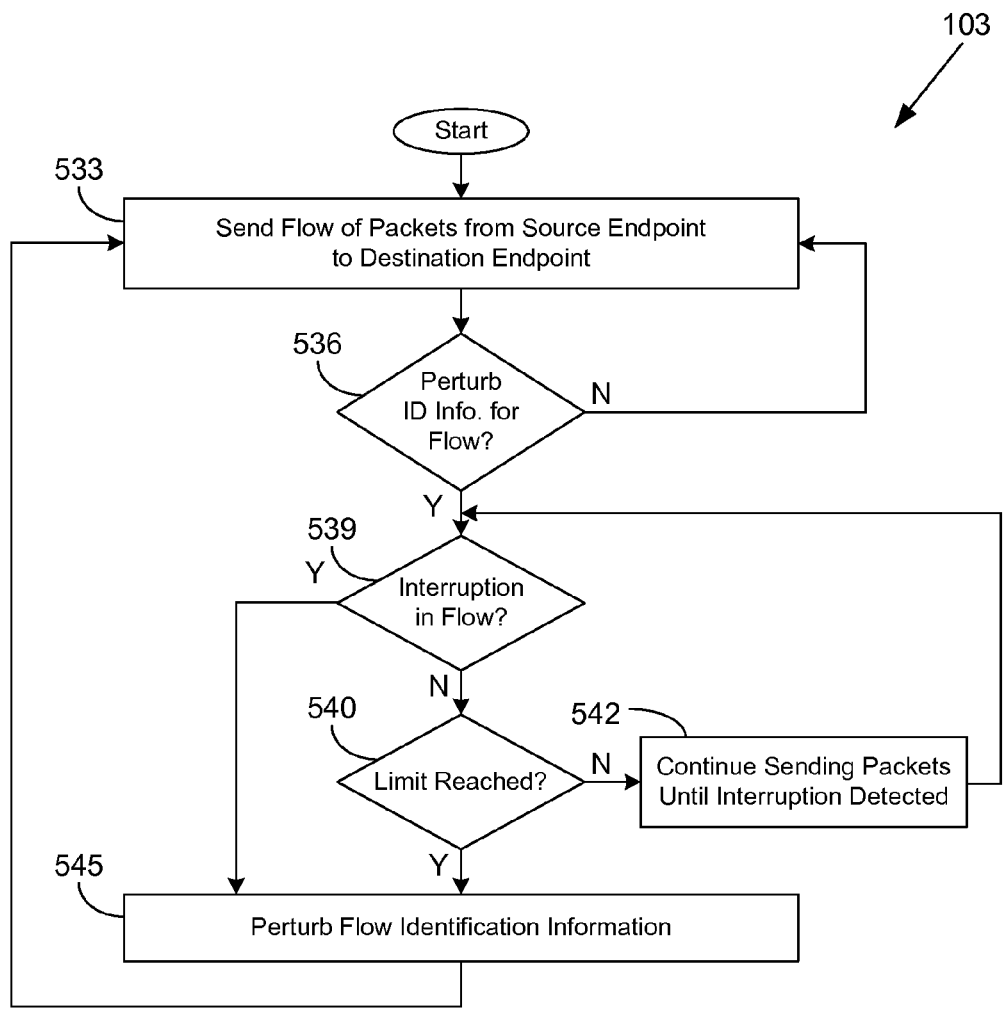

Referring next to FIG. 5B, shown is a flowchart that provides another example of the operation of a portion of the source network device 103 according to various embodiments. It is understood that the flowchart of FIG. 5B provides merely an example of the many different types of functional arrangements that may be employed to implement the operation of the portion of the source network device 103 as described herein. As an alternative, the flowchart of FIG. 5B may be viewed as depicting an example of steps of a method implemented in the source network device 103 according to one or more embodiments.

Beginning with box 533, the source network device 103 sends a flow 124 (FIG. 1) of packets from a source endpoint 203 (FIG. 2) to a destination endpoint 206 (FIG. 2) at a destination network device 106 (FIG. 1). The sending may involve forwarding the flow 124 of packets to an intermediate destination in a network, e.g., a gateway. In box 536, the source network device 103 determines whether the flow identification information 133 (FIG. 1) for the flow 124 is to be perturbed. For example, the source network device 103 may be configured to perturb the flow identification information 133 randomly, at predefined intervals, in response to detecting congestion, etc. In some embodiments, the source network device 103 may be configured to request a change to flow hashing logic 121 (FIG. 1) implemented in the router 112 (FIG. 1) or other equipment in the network 109*a* (FIG. 1) or network 109*b* (FIG. 1) instead of changing the flow identification information 133 directly. If the source network device 103 determines not to perturb the flow identification information 133, the source network device 103 returns to box 533 and continues sending the flow 124 of packets.

If, instead, the source network device 103 determines that the flow identification information 133 for the flow 124 is to be perturbed, the source network device 103 continues from box 536 to box 539. In box 539, the source network device 103 determines whether a temporary interruption in the flow 124 is detected. For example, the perturbation may be performed relative to such a temporary interruption. In other embodiments, however, the perturbation may be performed irrespective to a temporary interruption.

If a temporary interruption is not detected, the source network device 103 may move to box 540 and determine whether a limit has been reached for waiting for an interruption. If a limit has not been reached, the source network device moves from box 540 to box 542 and continues sending packets for the flow 124 until such an interruption is detected. The source network device 103 then returns to box 539. If, instead, a temporary interruption in the flow 124 is detected, the source network device 103 moves from box 539 to box 545. If the limit has been reached, the source network device 103 moves from box 540 to box 545 as well.

In box 545, the source network device 103 effects a perturbation to the flow identification information 133. Unlike in FIG. 5A, the destination network device 106 may already know of the impending perturbation without a handshake sequence via communication via an upper-layer protocol, a predetermined perturbation sequence, and/or other approaches. In some cases, the destination network device 106 may not be informed of the perturbation. Depending on the overlay protocol used, certain identification information may be modified with the data still arriving transparently at the destination network device 106. The source network device 103 then returns to box 543 and continues sending the flow 124 of packets according to the perturbed flow identification information 133.

Figure 5C:
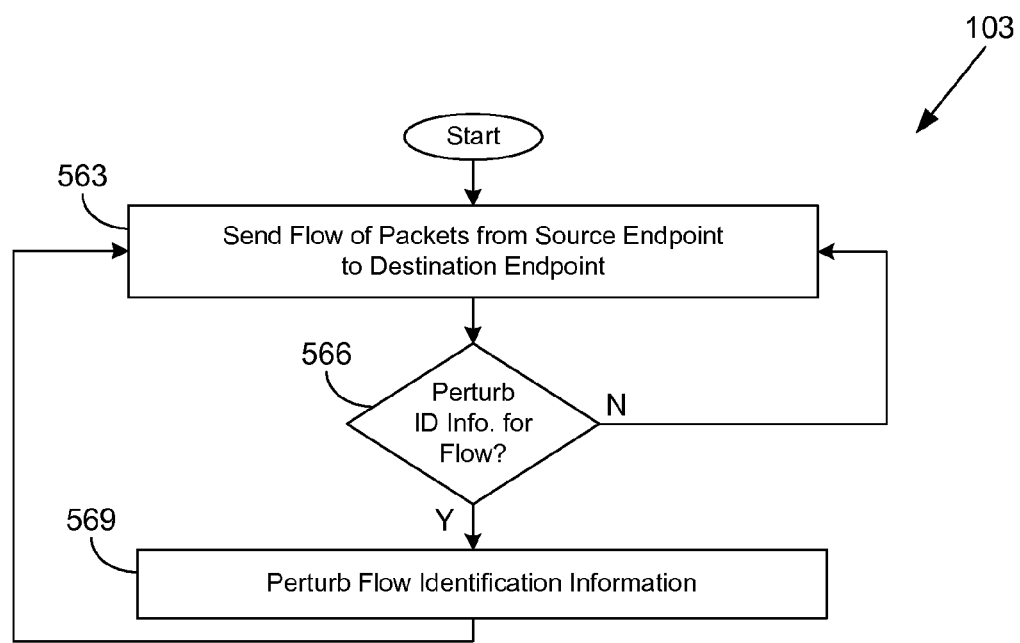

Referring next to FIG. 5C, shown is a flowchart that provides still another example of the operation of a portion of the source network device 103 according to various embodiments. It is understood that the flowchart of FIG. 5C provides merely an example of the many different types of functional arrangements that may be employed to implement the operation of the portion of the source network device 103 as described herein. As an alternative, the flowchart of FIG. 5C may be viewed as depicting an example of steps of a method implemented in the source network device 103 according to one or more embodiments.

Beginning with box 563, the source network device 103 sends a flow 124 (FIG. 1) of packets from a source endpoint 203 (FIG. 2) to a destination endpoint 206 (FIG. 2) at a destination network device 106 (FIG. 1). The sending may involve forwarding the flow 124 of packets to an intermediate destination in a network, e.g., a gateway. In box 566, the source network device 103 determines whether the flow identification information 133 (FIG. 1) for the flow 124 is to be perturbed. For example, the source network device 103 may be configured to perturb the flow identification information 133 randomly, at predefined intervals, in response to detecting congestion, etc. In some embodiments, the source network device 103 may be configured to request a change to flow hashing logic 121 (FIG. 1) implemented in the router 112 (FIG. 1) or other equipment in the network 109a (FIG. 1) or network 109b (FIG. 1) instead of changing the flow identification information 133 directly. If the source network device 103 determines not to perturb the flow identification information 133, the source network device 103 returns to box 563 and continues sending the flow 124 of packets.

If, instead, the source network device 103 determines that the flow identification information 133 for the flow 124 is to be perturbed, the source network device 103 continues from box 566 to box 569. In box 569, the source network device 103 effects a perturbation to the flow identification information 133. Unlike in FIG. 5A, the destination network device 106 may already know of the impending perturbation without a handshake sequence via communication via an upper-layer protocol, a predetermined perturbation sequence, and/or other approaches. In some cases, the destination network device 106 may not be informed of the perturbation. Depending on the overlay protocol used, certain identification information may be modified with the data still arriving transparently at the destination network device 106. The source network device 103 then returns to box 563 and continues sending the flow 124 of packets according to the perturbed flow identification information 133.

Figure 6:
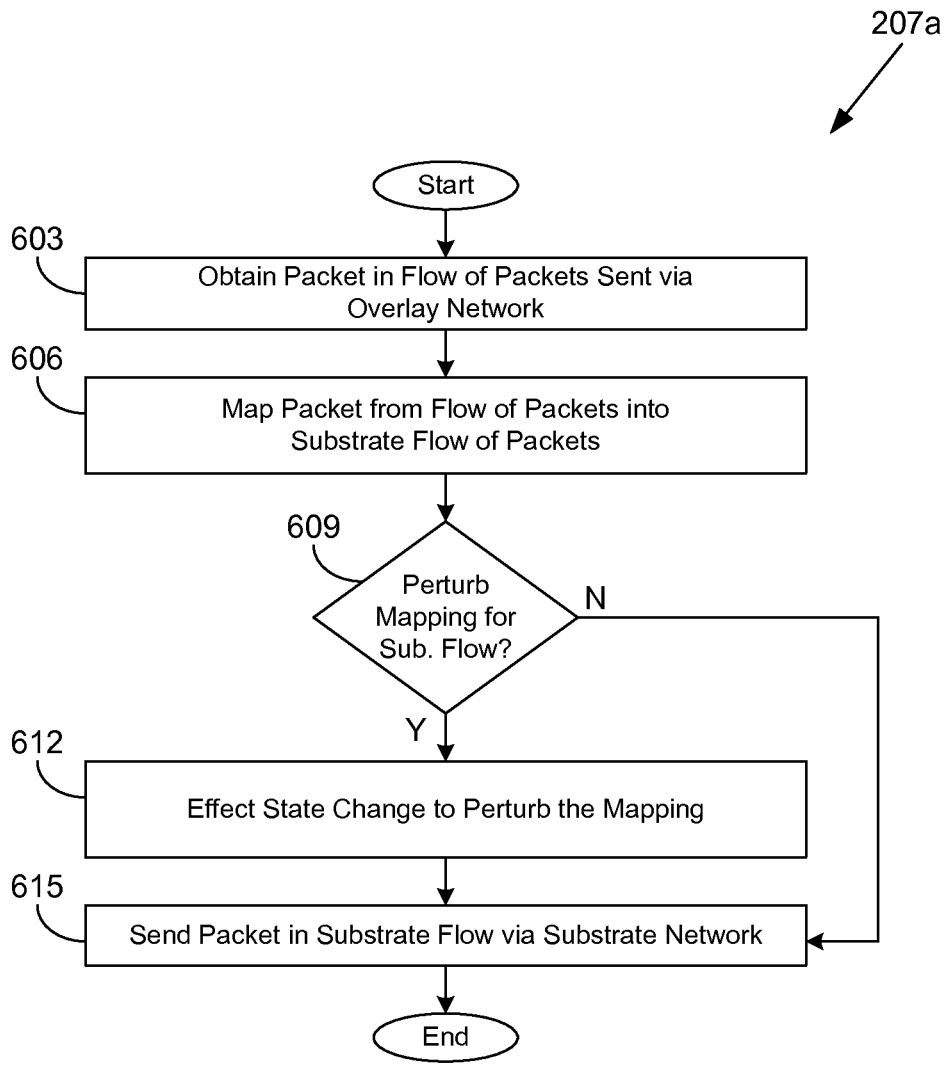
FIG. 6 is a flowchart illustrating one example of functionality implemented as portions of an overlay network endpoint in the networked environment of FIG. 2 according to various embodiments of the present disclosure.

Moving on to FIG. 6, shown is a flowchart that provides one example of the operation of a portion of the overlay network endpoint 207a according to various embodiments. It is understood that the flowchart of FIG. 6 provides merely an example of the many different types of functional arrangements that may be employed to implement the operation of the portion of the overlay network endpoint 207a as described herein. As an alternative, the flowchart of FIG. 6 may be viewed as depicting an example of steps of a method implemented in the overlay network endpoint 207a according to one or more embodiments.

Beginning with box 603, the overlay network endpoint 207a obtains a packet in flow 124 (FIG. 2) of packets sent via an overlay network from a source endpoint 203 (FIG. 2). In box 606, the overlay network endpoint 207a maps the packet from the flow 124 into a substrate flow 224 (FIG. 2) of packets. In box 609, the overlay network endpoint 207a determines whether to perturb the mapping. For example, the overlay network endpoint 207a may determine to perturb the substrate flow identification information 233 (FIG. 2) randomly, at predefined intervals, in response to congestion, in response to a request from the source endpoint 203 or destination endpoint 206 (FIG. 2), and/or at other times.

If the overlay network endpoint 207a decides to perturb the mapping, the overlay network endpoint 207a continues to box 612 and effects a state change to perturb the mapping of the packet to a substrate flow 224. To this end, the overlay network endpoint 207a may change a hashing function 127 (FIG. 1) or a hash seed 130 (FIG. 1) employed in the flow hashing logic 121 (FIG. 1) of the overlay network endpoint 207a that may be used to generate a source port or other field in the substrate flow identification information 233. Alternatively, the overlay network endpoint 207a may otherwise negotiate a change with the overlay network endpoint 207b (FIG. 2) relative to any field in the substrate flow identification information 233. In some embodiments, the overlay network endpoint 207a may instead request a hashing-related change to be effected in the router 112 (FIG. 2) or other networking equipment. In some cases, the overlay network endpoint 207a may effect a change without a specific change-indicating communication with the overlay network endpoint 207b.

In box 615, the overlay network endpoint 207a sends the substrate flow 224 to the overlay network endpoint 207b via the substrate network 209a (FIG. 2). Thereafter, the portion of the overlay network endpoint 207a ends. If in box 609, the overlay network endpoint 207a instead determines not to perturb the substrate flow identification information 233, the overlay network endpoint 207a continues to box 615 directly from box 609.

Figure 7:
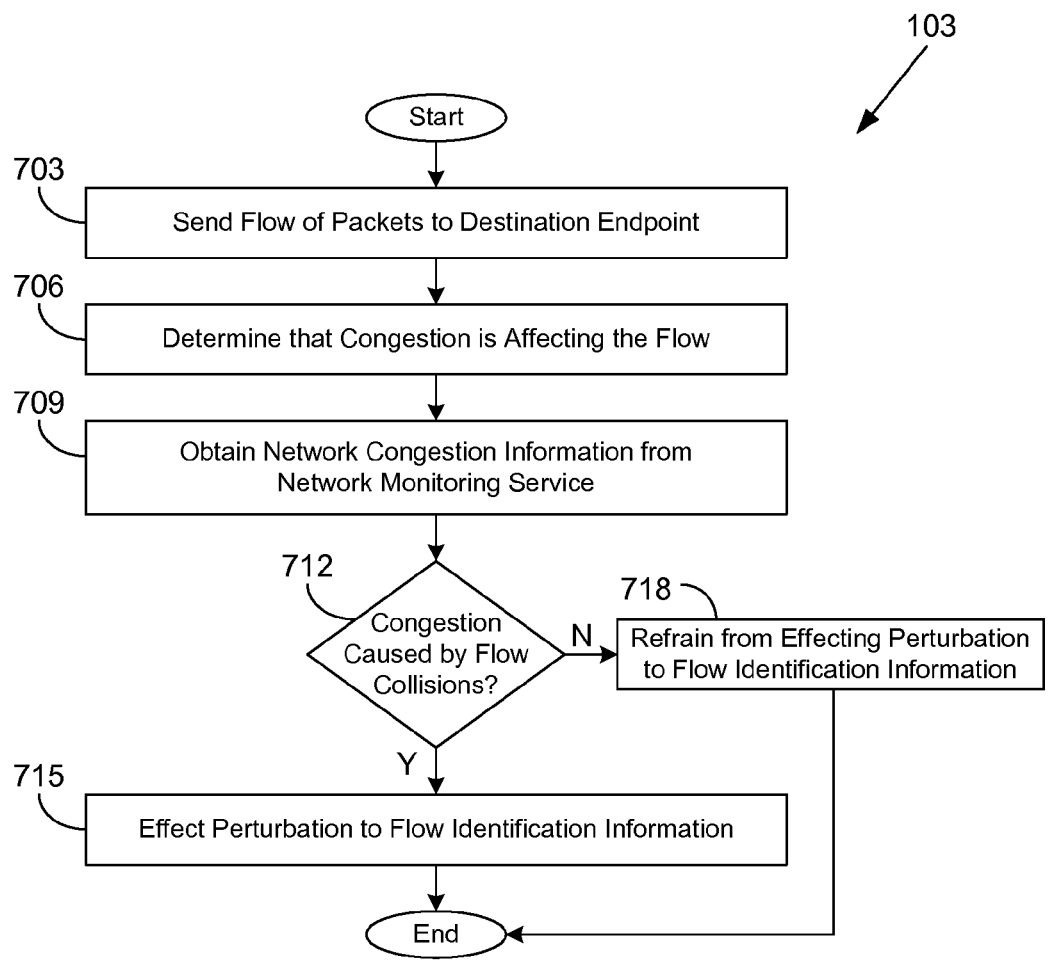
FIG. 7 is a flowchart illustrating one example of functionality implemented as portions of a source network device in the networked environment of FIG. 3 according to various embodiments of the present disclosure.

Turning now to FIG. 7, shown is a flowchart that provides one example of the operation of a portion of the source network device 103 according to various embodiments. It is understood that the flowchart of FIG. 7 provides merely an example of the many different types of functional arrangements that may be employed to implement the operation of the portion of the source network device 103 as described herein. As an alternative, the flowchart of FIG. 7 may be viewed as depicting an example of steps of a method implemented in the source network device 103 according to one or more embodiments. Additionally, in other embodiments, the functionality described with respect to FIG. 7 may be implemented in other network devices, e.g., the overlay network endpoints 207 (FIG. 2), the router 112 (FIG. 1), the destination network devices 106 (FIG. 1), and so on.

Beginning with box 703, the source network device 103 sends a flow 124 (FIG. 1) of packets to a destination endpoint 206 (FIG. 2) at a destination network device 106. In box 706, the source network device 103 determines that congestion is affecting the flow 124. Such congestion may be caused by generalized network congestion or local flow collisions from flow-based hashing in the router 112. In box 709, the source network device 103 obtains network congestion information 315 (FIG. 3) from the network monitoring service 309 (FIG. 3).

In box 712, the source network device 103 determines whether the congestion experienced by the flow 124 is caused by local flow collisions. The determination is made based at least in part on the network congestion information 315 obtained from the network monitoring service 309. If the source network device 103 determines that the congestion experienced by the flow 124 is caused by local flow collisions, the source network device 103 moves to box 715 and effects a perturbation to the flow identification information 133. Alternatively, a change to flow hashing logic 121 (FIG. 1) may be requested. In one scenario, a network monitoring service 309 may be configured to instruct the source network device 103 to perturb the flow 124 so as to use a particular route that is known not to be congested. In another scenario, the perturbation may be made irrespective to the consequent routing. Thereafter, the portion of the source network device 103 ends. Where the functionality of FIG. 7 is implemented by an overlay network endpoint 207a (FIG. 2), the overlay network endpoint 207a may effect a perturbation to the substrate flow identification information 233 (FIG. 2).

If, instead, the source network device 103 determines that the congestion experienced by the flow 124 is not caused by router-local flow collisions (e.g., the congestion is in fact network-wide congestion, etc.), the source network device 103 moves instead from box 712 to box 718. In box 718, the source network device 103 refrains from effecting a perturbation to the flow identification information 133. Thereafter, the portion of the source network device 103 ends. Where the functionality of FIG. 7 is implemented by an overlay network endpoint 207a, the overlay network endpoint 207a may refrain from effecting a perturbation to the substrate flow identification information 233.

Figure 8:
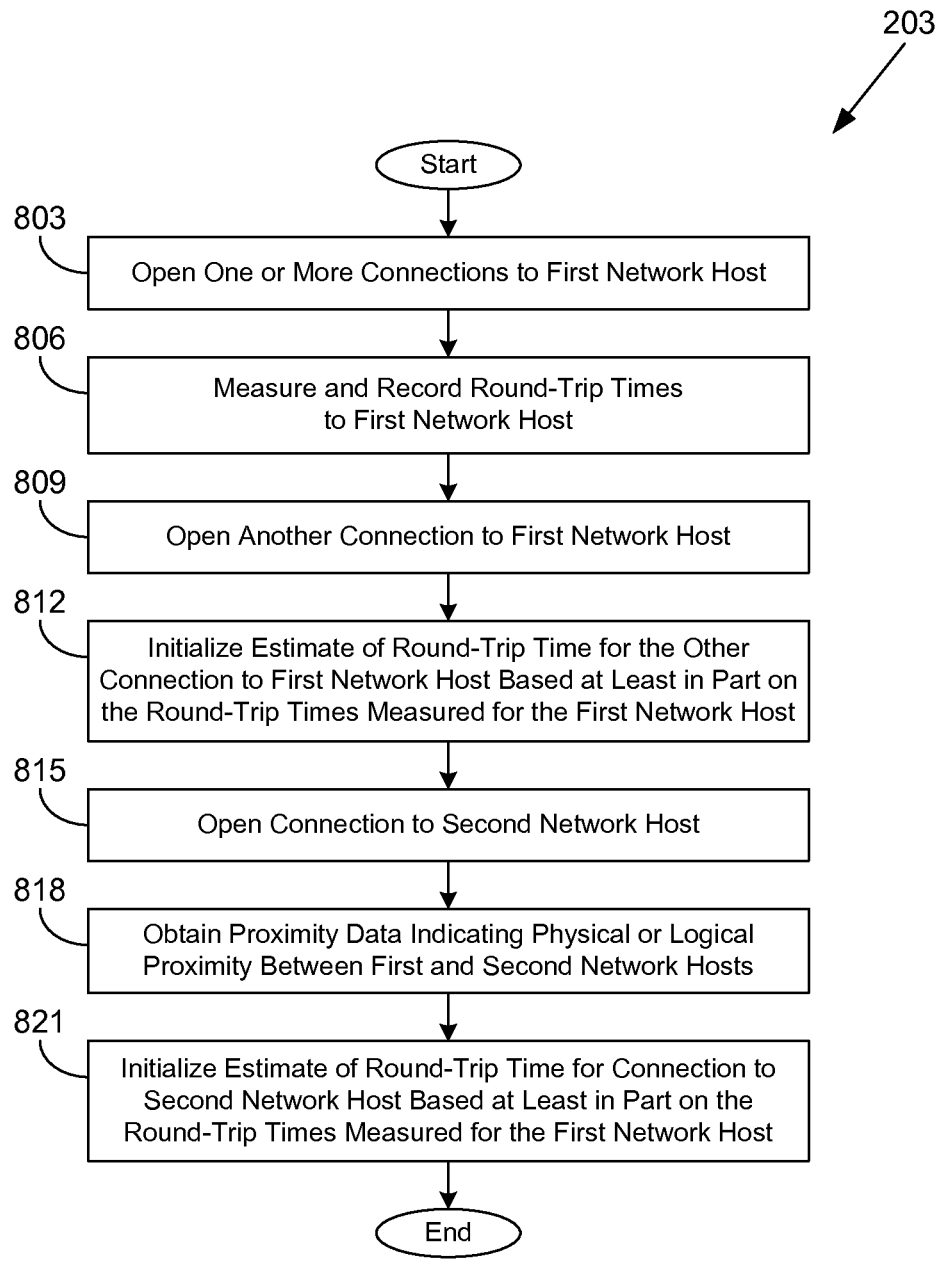
FIG. 8 is a flowchart illustrating one example of functionality implemented as portions of a source endpoint in the networked environment of FIG. 4 according to various embodiments of the present disclosure.

Referring next to FIG. 8, shown is a flowchart that provides one example of the operation of a portion of the source endpoint 203 from the networked environment 400 (FIG. 4) according to various embodiments. It is understood that the flowchart of FIG. 8 provides merely an example of the many different types of functional arrangements that may be employed to implement the operation of the portion of the source endpoint 203 as described herein. As an alternative, the flowchart of FIG. 8 may be viewed as depicting an example of steps of a method implemented in the overlay network endpoint 207a according to one or more embodiments.

Beginning with box 803, the source endpoint 203 opens one or more connections to a first network host at a destination endpoint 206 (FIG. 4) by way of a network 403 (FIG. 4). For example, such connections may be TCP connections or other types of connections. In box 806, the source endpoint 203 measures and records round-trip times to the first network host through the connection for multiple packets sent via the connection. Alternatively, the source endpoint 203 may send ICMP pings or other connectionless probing traffic to the first network host to determine round-trip times. In box 809, the source endpoint 203 opens another connection to the first network host at the destination endpoint 206 by way of the network 403. In box 812, the source endpoint 203 initializes an estimate of the round-trip time between the source endpoint 203 and the first network host for the other connection based at least in part on the round-trip times measured and recorded for the connection(s) to the first network host in box 806.

Next, in box 815, the source endpoint 203 opens a connection to a second network host at a destination endpoint 206. In box 818, the source endpoint 203 obtains proximity data indicating the physical and/or logical proximity between the first network host and the second network host. To this end, the source endpoint 203 may make a request to the global data service 415 (FIG. 4) for the network host proximity data 418 (FIG. 4) relating the physical and/or logical location of the first network host to the second network host. In some cases, the proximity data 418 may be locally determined by probing the round-trip times for neighboring hosts, where hosts are considered to be proximate based at least in part on round-trip-time similarity.

In box 821, the source endpoint 203 initializes an estimate of the round-trip time for the connection from the source endpoint 203 to the second network host based at least in part on the round-trip times measured and recorded for the connection(s) to first network host in box 806 and the proximity data. Thereafter, the portion of the source endpoint 203 ends.

Figure 9:
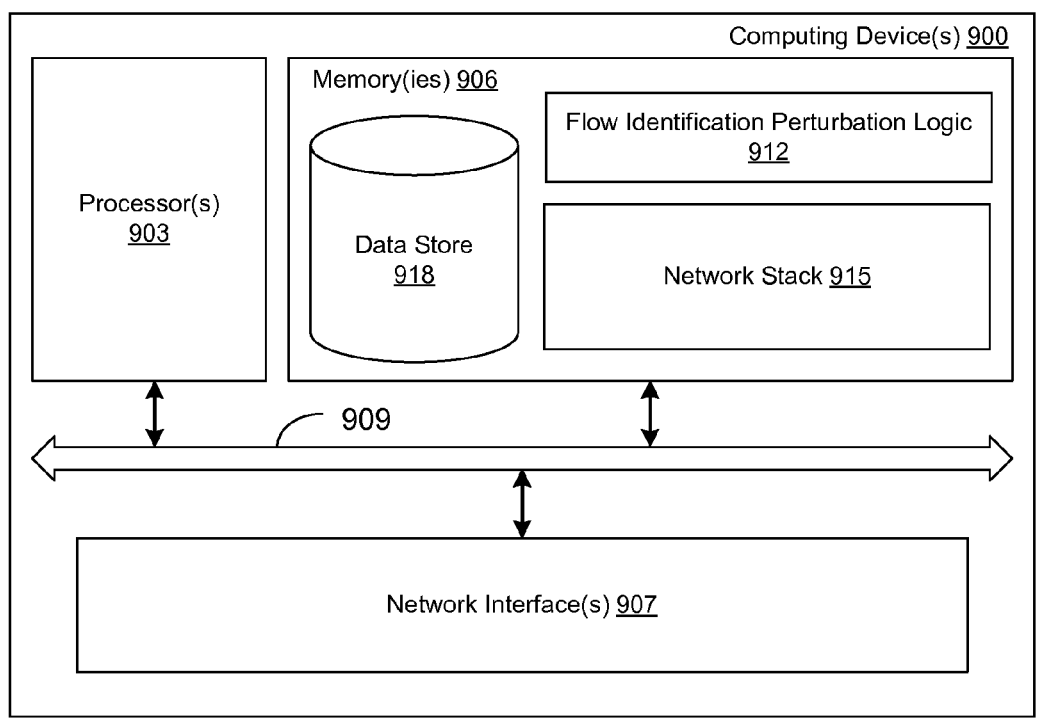
FIG. 9 is a schematic block diagram that provides one example illustration of a computing device employed in the networked environments of FIGS. 1-4 according to various embodiments of the present disclosure.

With reference to FIG. 9, shown is a schematic block diagram of the computing device 900 according to an embodiment of the present disclosure. The computing device 900 includes at least one processor circuit, for example, having a processor 903, a memory 906, one or more network interfaces 907, all of which are coupled to a local interface 909. To this end, the computing device 900 may comprise, for example, at least one server computer, desktop computer, mobile computer, smart phone, router, etc. For example, the computing device 900 may correspond to a source network device 103 (FIG. 1), a destination network device 106 (FIG. 1), an overlay network endpoint 207 (FIG. 2), a router 112 (FIG. 1), a computing device 303 (FIG. 3), a source endpoint 203 (FIG. 4), a destination endpoint 206 (FIG. 4), a computing device 409 (FIG. 4), and/or other types of network devices which may be employed in the networked environments 100 (FIG. 2), 200 (FIG. 2), 300 (FIG. 3), or 400 (FIG. 4). The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 may be flow identification perturbation logic 912, a network stack 915, a network monitoring service 309 (FIG. 3), a global data service 415 (FIG. 4), and/or potentially other applications. The flow identification perturbation logic 912 may be executed to perturb flow identification information 133 (FIG. 1) and/or substrate flow identification information 233 (FIG. 2) as has been described. The network stack 915 corresponds to a TCP/IP stack, a UDP/IP stack, and/or other network stack logic. Also stored in the memory 906 may be a data store 918 storing measured round-trip times and/or other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the flow identification perturbation logic 912, the network stack 915, the network monitoring service 309, the global data service 415, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-7 show the functionality and operation of an implementation of portions of the source network device 103, the overlay network endpoint 207a (FIG. 2), and the source endpoint 203. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the flow identification perturbation logic 912, the network stack 915, the network monitoring service 309, or the global data service 415, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a network device, comprising:
   code that opens a plurality of first connections to a first network host;
   code that measures a plurality of round-trip times associated with sending a first plurality of packets to the first network host via the plurality of first connections;
   code that opens a plurality of second connections to a second network host;
   code that measures a plurality of round-trip times associated with sending a second plurality of packets to the second network host via the plurality of second connections;
   code that opens a third connection to a third network host;
   code that obtains proximity data indicating a physical proximity between the first network host and the third network host and a physical proximity between the second network host and the third network host; and
   code that initializes a round-trip-time estimate for the third connection based at least in part on the round-trip times measured for the plurality of first connections, the round-trip times measured for the plurality of second connections, and the proximity data.

2. The non-transitory computer-readable medium of claim 1, further comprising:
   code that sends a flow of packets by way of the third connection, the flow of packets being associated with flow identification information;
   code that detects whether congestion is affecting the flow of packets based at least in part on the round-trip-time estimate; and
   code that effects a perturbation to the flow identification information for the flow of packets in response to determining that congestion is affecting the flow of packets.

3. The non-transitory computer-readable medium of claim 1, wherein the plurality of first connections, the plurality of second connections, and the third connection are transmission control protocol (TCP) connections.

4. A system, comprising:
   a device connected to a network, the device being configured to:
      open a plurality of first connections to a first network host;
      measure a plurality of round-trip times associated with sending a first plurality of packets to the first network host via the plurality of first connections;
      open at least one second connection to a second network host;
      obtain proximity data indicating a physical or logical proximity of the second network host to the first network host;
      measure at least one round-trip time associated with sending a second plurality of packets to the second network host via the at least one second connection;
      open a third connection to the first network host; and
      initialize a round-trip-time estimate for the third connection based at least in part on the round-trip times measured for the plurality of first connections, the at least one round-trip time measured for the at least one second connection, and the proximity data.

5. The system of claim 4, wherein the plurality of first connections and the third connection correspond to transmission control protocol (TCP) connections.

6. The system of claim 4, wherein the plurality of first connections and the third connection correspond to user datagram protocol (UDP) connections.

7. The system of claim 4, wherein the device is further configured to determine whether a packet sent via the third connection is lost based at least in part on the round-trip-time estimate.

8. The system of claim 4, wherein the device is configured to generate the proximity data by probing round-trip times for a plurality of network neighbors of the device.

9. The system of claim 8, wherein the probing is scheduled based at least in part on network utilization by the device.

10. The system of claim 4, wherein the proximity data indicates whether the first network host and the second network host are located at proximate locations within a data center.

11. The system of claim 4, wherein the device is further configured to send a request for the proximity data to a service, the request specifying at least one of a network address of the first network host or a network address of the second network host.

12. The system of claim 4, wherein the device is further configured to:
   send a flow of packets by way of the third connection, the flow of packets being associated with flow identification information;
   detect whether congestion is affecting the flow of packets based at least in part on the round-trip-time estimate; and
   effect a perturbation to the flow identification information for the flow of packets in response to determining that congestion is affecting the flow of packets.

13. The system of claim 12, wherein the device is further configured to:
   detect an interruption in the flow of packets; and
   effect the perturbation relative to the interruption in the flow of packets.

14. A method, comprising:
   opening, in a device, a first connection to a first network host;
   measuring, in the device, a plurality of round-trip times associated with sending a first plurality of packets to the first network host via the first connection;
   opening, in the device, a second connection to a second network host;
   obtaining, in the device, proximity data indicating a physical or logical proximity between the first network host and the second network host; and
   initializing, in the device, a round-trip-time estimate for the second connection based at least in part on the round-trip times measured for the first connection and the proximity data.

15. The method of claim 14, further comprising:
   measuring, in the device, a plurality of round-trip times associated with sending a second plurality of packets to the second network host via the second connection;
   opening, in the device, a third connection to a third network host;
   obtaining, in the device, additional proximity data indicating a physical proximity between the third network host and the second network host and a physical proximity between the third network host and the first network host; and
   initializing, in the device, a round-trip-time estimate for the third connection based at least in part on the round-trip times measured for the first connection, the round-trip times measured for the second connection, and the additional proximity data.

16. The method of claim 14, further comprising:
   opening, in the device, a third connection to the first network host;
   measuring, in the device, a plurality of round-trip times associated with sending a second plurality of packets to the first network host via the third connection; and
   wherein the round-trip-time estimate for the second connection is initialized based at least in part on the round-trip times measured for the third connection.

17. The method of claim 14, further comprising:
   opening, in the device, a third connection to the second network host;
   measuring, in the device, a plurality of round-trip times associated with sending a second plurality of packets to the second network host via the third connection; and
   wherein the round-trip-time estimate for the second connection is initialized based at least in part on the round-trip times measured for the third connection.

18. The method of claim 14, wherein the first connection and the second connection are transmission control protocol (TCP) connections.

19. The method of claim 14, wherein the first connection and the second connection are user datagram protocol (UDP) connections.

20. The method of claim 14, wherein at least some of the round-trip times are measured by internet control message protocol (ICMP) pings.

21. The method of claim 14, wherein the proximity data indicates whether the first network host and the second network host are located at proximate locations within a data center.

22. The method of claim 14, wherein the proximity data indicates a predicted similarity between round-trip times from the device to the first network host and round-trip times from the device to the second network host.

23. The method of claim 14, further comprising sending, in the device, a request for the proximity data to a service, the request specifying at least one of a network address of the first network host or a network address of the second network host.

24. The method of claim 14, further comprising:
sending, in the device, a flow of packets by way of the second connection, the flow of packets being associated with flow identification information;
detecting, in the device, whether congestion is affecting the flow of packets based at least in part on the round-trip-time estimate; and
effecting, in the device, a perturbation to the flow identification information for the flow of packets in response to determining that congestion is affecting the flow of packets.

25. The method of claim 24, further comprising:
detecting, in the device, an interruption in the flow of packets; and
effecting, in the device, the perturbation relative to the interruption in the flow of packets.

26. The method of claim 24, wherein the perturbation comprises a change to at least one of a source port or a destination port of the flow identification information, wherein the perturbation does not effect a change to any network address of the flow identification information.

* * * * *